United States Patent [19]
Sano et al.

[11] Patent Number: 5,282,399
[45] Date of Patent: Feb. 1, 1994

[54] CONTROL SYSTEM FOR VEHICULAR POWER PLANT INCLUDING AUTOMATIC TRANSMISSION AND EXHAUST BRAKE

[75] Inventors: Eiji Sano; Shigetsugu Matsumoto, both of Shizuoka, Japan

[73] Assignee: Jatco Corporation, Japan

[21] Appl. No.: 853,067

[22] Filed: Mar. 17, 1992

[30] Foreign Application Priority Data

| Mar. 25, 1991 | [JP] | Japan | 3-84788 |
| Mar. 25, 1991 | [JP] | Japan | 3-84789 |
| Mar. 25, 1991 | [JP] | Japan | 3-84790 |
| Mar. 25, 1991 | [JP] | Japan | 3-84791 |
| Mar. 25, 1991 | [JP] | Japan | 3-84792 |

[51] Int. Cl.$^5$ ............................................... B60K 41/10
[52] U.S. Cl. ........................................ 74/856; 123/323; 192/4 A
[58] Field of Search ............... 192/4 A; 364/426.01; 74/866, 856; 123/323

[56] References Cited

U.S. PATENT DOCUMENTS

| 4,669,435 | 6/1987 | Furusawa et al. | 123/323 |
| 4,765,201 | 8/1988 | Ishiguro et al. | 192/1.23 X |
| 4,849,899 | 7/1989 | Cote et al. | 192/0.033 X |
| 4,961,484 | 10/1990 | Kato et al. | 192/3.58 X |
| 5,016,495 | 5/1991 | Takizawa | 192/4 A X |
| 5,088,348 | 2/1992 | Hiramuki | 74/859 |
| 5,107,725 | 4/1992 | Takahashi | 74/867 |

FOREIGN PATENT DOCUMENTS

2-78741 3/1990 Japan.

*Primary Examiner*—Rodney H. Bonck
*Attorney, Agent, or Firm*—Ronald P. Kananen

[57] ABSTRACT

A control system for a vehicular power plant including an automatic transmission and an exhaust brake. The exhaust brake includes a butterfly valve movably disposed in an exhaust pipe. The control system is comprised of a control unit which is supplied with a signal representative of an engine brake condition and is adapted to generate a signal commanding an automatic downshift of the automatic transmission. Under the operation of the control unit, the exhaust brake is temporarily put into an inoperative condition in response to both the detected engine brake condition and the downshift command.

9 Claims, 13 Drawing Sheets

CONTROL SYSTEM FOR VEHICULAR POWER PLANT INCLUDING AUTOMATIC TRANSMISSION AND EXHAUST BRAKE

BACKGROUND OF THE INVENTION

1. Field of the Invention

This invention relates to improvements in a control system for a vehicular power plant including an automatic transmission and an exhaust brake, and more particularly to a device for temporarily putting the exhaust brake into an inoperative condition to suppress a shift shock due to the application of the exhaust brake.

2. Description of the Prior Art

Hitherto, an exhaust brake has been proposed and put into practical use, in which exhaust gas from an internal combustion engine is blockable to improve an engine braking. An example of control systems for the exhaust brake is disclosed in Japanese Patent Provisional Publication No. 2-78741, in which the operation of the exhaust brake is stopped for a predetermined time after a transmission selector for an automatic transmission has been changed to have a position for application of the engine brake. Thus, during an automatic transmission shifting upon a driver's selecting operation, the exhaust brake is released from being applied thereby preventing an excessive shift shock from occurring.

However, drawbacks have been encountered in the above conventional exhaust brake control system, as discussed below. That is to say, although the conventional control system has an advantageous effect to reduce the shift shock during the automatic transmission shifting upon the driver's selecting operation, it has difficulties that a strong shift shock occurs when a shiftdown is automatically made according to a control program of a control unit. More specifically, assuming that the vehicle speed is considerably high when a driver's selecting operation is made, for example, from a D-range to a 1-range for engine braking, the vehicle speed cannot be immediately lowered to the first speed, in which a shift from the third to the second speed is first made and then another shift from the second to the first speed is subsequently made. In such a conventional control system, the exhaust brake is in an operative condition when the third to second speed shift and the second to first speed shift are made, thereby causing strong shift shocks. Otherwise, when the vehicle speed is relatively low when the driver's selecting operation is made, the third to second speed shift is carried out simultaneously with the selecting operation, in which the shift shock is softened because the exhaust brake is temporarily released from being applied. However, when the second to first speed shift is carried out, the exhaust brake is in operation thereby causing a strong shift shock.

SUMMARY OF THE INVENTION

It is an object of the present invention to provide an improved control system for a vehicular power plant including an automatic transmission and an exhaust brake, which can effectively overcome drawbacks encountered in conventional similar control systems.

Another object of the present invention is to provide an improved control system for a vehicular power plant including an automatic transmission and an exhaust brake, which temporarily releases the exhaust brake from application even at an automatic shiftdown in the automatic transmission, improving a drivability of a vehicle provided with the power plant.

A control system of the present invention is for a vehicular power plant including an automatic transmission and an exhaust brake. The control system is comprised of first means for detecting an engine braking condition and a command of making a downshift of the automatic transmission. Additionally, second means are provided to temporarily put the exhaust brake into an inoperative condition in response to both said detected engine braking condition and the downshift command.

Accordingly, when the automatic downshift of the automatic transmission is commanded, the exhaust brake is released from application for a predetermined time from the command. Therefore, the downshift is carried out in a normal engine reverse-driving condition in which the engine is driven by road wheels, without the effect of the exhaust brake. As a result, a strong shift shock can be effectively prevented from occurrence even during the automatic downshift in the automatic transmission.

DETAILED DESCRIPTION OF THE INVENTION

Figure 1:
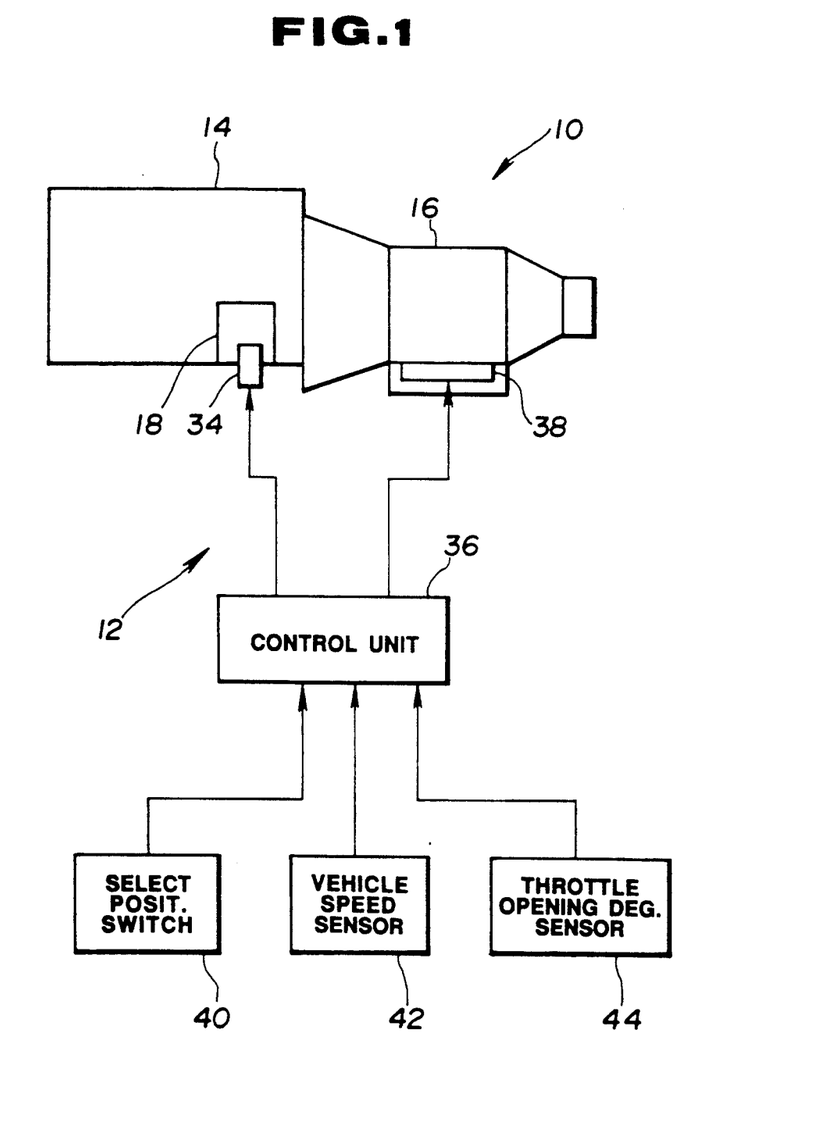
FIG. 1 is a diagrammatic view of a first embodiment of a control system for a vehicular power plant, in accordance with present invention.
Figure 2:
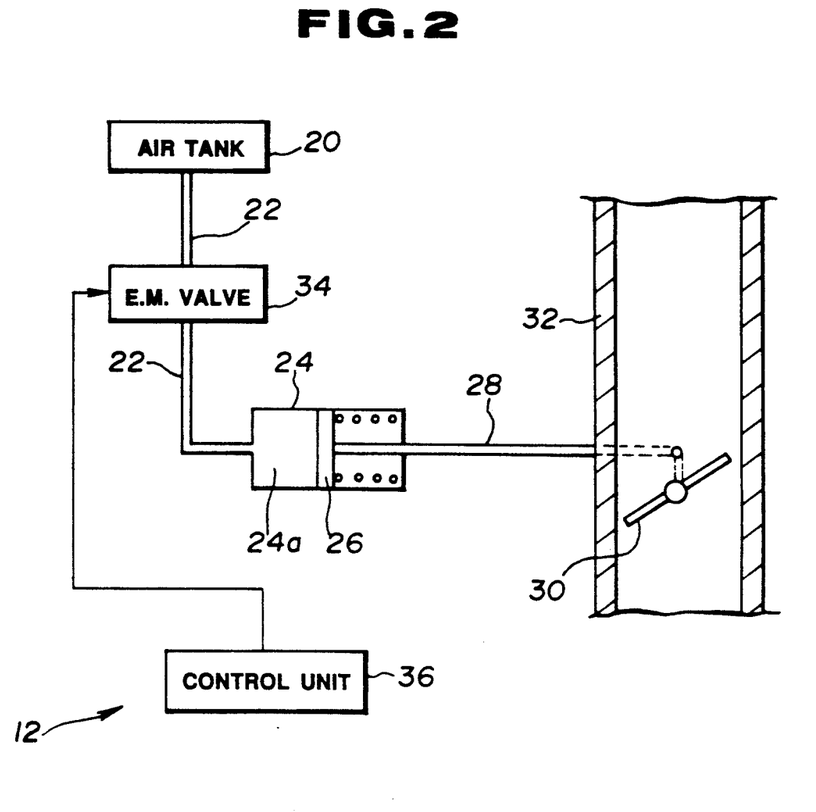
FIG. 2 is a schematic illustration of an exhaust brake used in the control system of FIG. 1.

Referring now to FIG. 1 and 2, there is shown a first embodiment of a control system 12 for a vehicular power plant 10, in accordance with the present invention. In this embodiment, the power plant 12 is for an automotive vehicle and therefore is mounted on a vehicle body, though not shown. The power plant 12 comprises an internal combustion engine 14 to which an automatic transmission 16 is incorporated, in which a power of the engine is transmitted through the transmission 16 to road wheels (not shown) as conventional. The engine 14 is provided with an exhaust brake 18 for increasing the effect of an engine brake.

The exhaust brake 18 includes an air tank 20 which is supplied with compressed air from an air pump (not shown) and filled with air at a constant pressure. The air tank 20 is connected through an air pipe or passage 22 with an air chamber 24a of an operating or air cylinder 24. The air chamber 24a is defined by a piston 26 slidably movably disposed in the air cylinder 24, and mechanically connected through a rod 28 to a butterfly valve 30. The butterfly valve 30 is rotatably movably disposed inside an exhaust pipe 32 which is connected to engine cylinders (not shown) of the engine 14. The exhaust gas from the engine cylinders is discharged out of the engine through the exhaust pipe 32. An electromagnetic valve 34 is operatively disposed in the air passage 22 to control the flow of air through the air passage 22 in accordance with control signals from a control unit 36. When the electromagnetic valve 34 is switched ON to open in accordance with the signals from the control unit 36, compressed air is supplied to the air chamber 24a of the air cylinder 24, so that the piston 26 is moved in a direction to compress a spring 26a thereby to close the butterfly valve 30. As a result, exhaust gas from the engine cylinders is blocked by the butterfly valve 30 so that the exhaust brake 18 is effected to improve the effect of engine brake applied to the engine 14, in which the exhaust brake 18 is in an operative condition. On the contrary, when the electromagnetic valve 34 is switched OFF, the butterfly valve 30 is opened to allow exhaust gas to flow through the exhaust pipe 32 thereby releasing the effect of the exhaust brake 18, in which the exhaust brake 18 is in an inoperative condition.

In this embodiment, the control unit 36 includes a microcomputer and is arranged to output control signals to the solenoids and the likes of control valves in a control valve assembly 38 forming part of the automatic transmission 16 in order that a hydraulic pressure in and shifting of the automatic transmission are controlled in accordance with the control signals on the basis of a control program stored in the control unit 36. It will be understood that the control unit 36 can output a signal for commanding an automatic shifting of the automatic transmission 16, to the control valves in the control valve assembly 38. The control unit 36 is electrically connected to a select position switch 40, a vehicle speed sensor 42 and a throttle position or opening degree sensor 44. The select position switch 24 is adapted to output a signal representative of a select position in a transmission selector (not shown). The vehicle speed sensor 42 is adapted to output a signal representative of a vehicle speed of the vehicle. The throttle opening degree sensor 44 is adapted to output a signal representative of an opening degree of a throttle valve (not shown) in an intake system of the engine.

Figure 3:
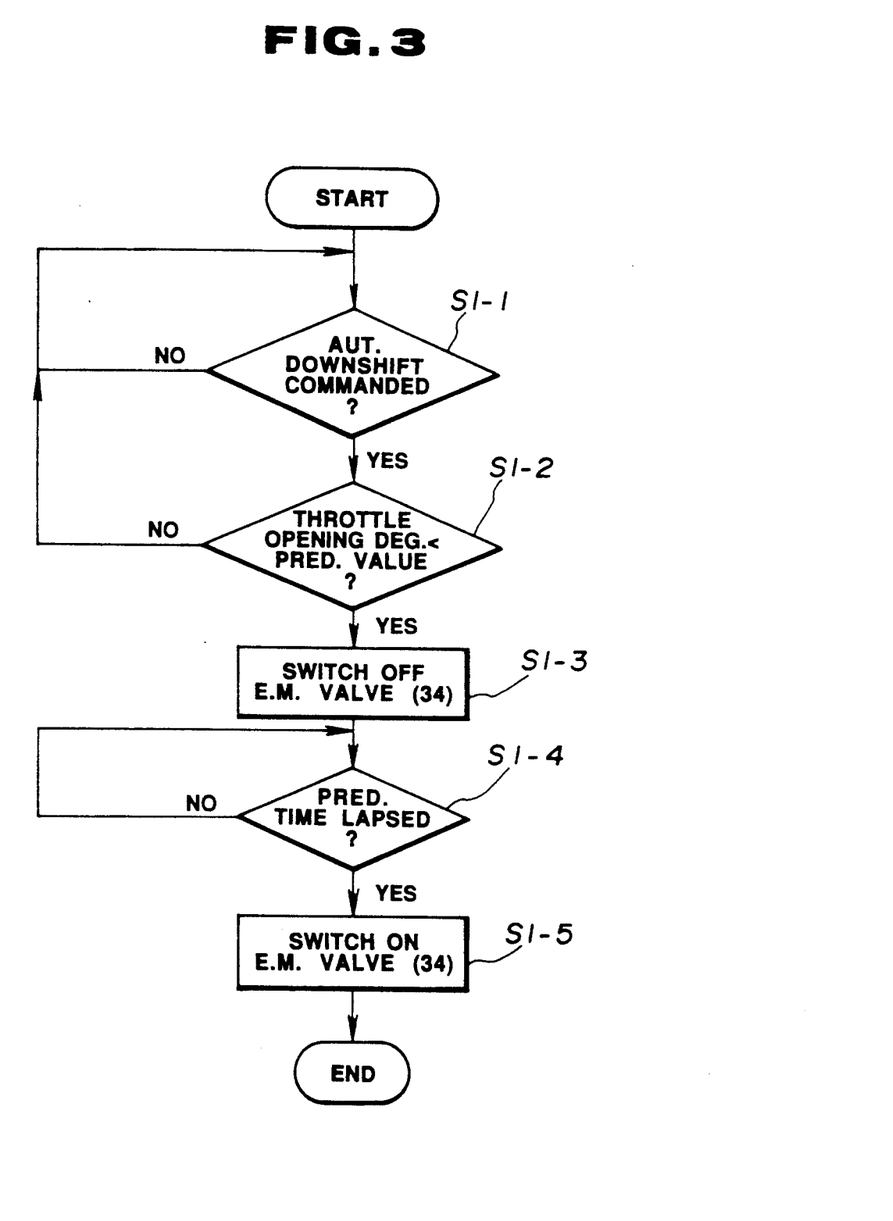
FIG. 3 is a flowchart showing a control routine for the control system of FIG. 1.

The manner of operation of the control system 12 will be discussed with reference to a flowchart in FIG. 3 in which the control unit 36 outputs the signal to operate or open the electromagnetic valve 34.

First, a judgement is made as to whether a signal for commanding an automatic downshift of the automatic transmission 16 is output from the control unit 36 at a step S1-1. In case of YES, a judgement is made as to whether the opening degree of the throttle valve is smaller than a predetermined value at a step S1-2. When the throttle valve opening degree is smaller than the predetermined value (i.e., an engine braking condition for requiring an engine brake is established), the electromagnetic valve 34 is switched OFF regardless of other vehicle and power plant operating conditions so that the exhaust brake 18 is brought into the inoperative condition at a step S1-3. Then, a judgement is made as to whether a predetermined time has lapsed after the electromagnetic valve 34 has been switched OFF at a step S1-4. In case of YES, the electromagnetic valve 34 is switched ON at a step S1-5 thereby compulsorily releasing the inoperative condition of the exhaust gas brake 18, so that the exhaust brake 18 comes into the operative condition.

Thus, according to the above control, for example in case that an automatic downshift occurs after making a transmission selection of a range for engine braking, the application of the exhaust brake 18 is released for the predetermined time after output of the signal for commanding the automatic shift. As a result, a so-called shift shock is softened or suppressed during the automatic shifting operation of the automatic transmission 16. Upon lapse of the predetermined time, the exhaust brake 18 is again effected or brought into the operative condition to obtain a strong engine brake. It will be understood that the above-mentioned predetermined time may be set according to vehicle speed and/or kind (for example, fourth to third speeds, and fourth to second speeds) of shift in the automatic transmission.

While an engine brake condition has been shown and described as being judged in response to the throttle opening degree smaller than the predetermined level, it will be understood that the engine brake condition may be judged when an engine operation detected by the control unit 36 is in a condition requiring the exhaust brake.

Thus, according to the first embodiment of the control system, in case of occurrence of the automatic downshift of the automatic transmission, the application of the exhaust brake is temporarily released thereby softening the shift shock of the automatic transmission.

Figure 4:
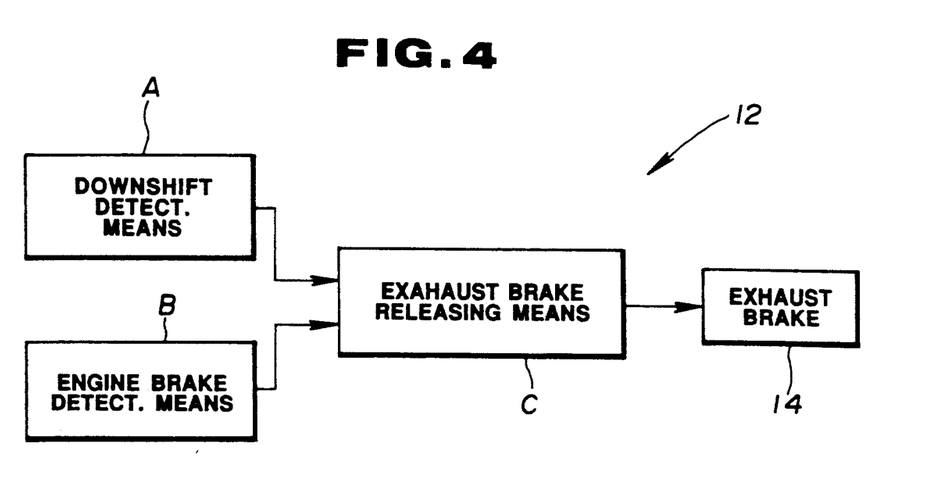
FIG. 4 is a block diagram showing the principle of the control system of FIG. 1.

FIG. 4 shows the principle of the above-discussed first embodiment control system 12. The control system is for the power plant 10 including the automatic transmission 16 and the exhaust brake 18. The control system 12 is comprised of downshift detecting means A for detecting a signal for commanding an automatic downshift of the transmission. Engine brake detecting means B are provided to detect a signal representative of the engine brake condition. Exhaust brake releasing means C are provided to temporarily put the exhaust brake in an inoperative condition for a predetermined time in response to both the detected automatic downshift commanding signal and the engine brake condition representing signal.

Figure 5:
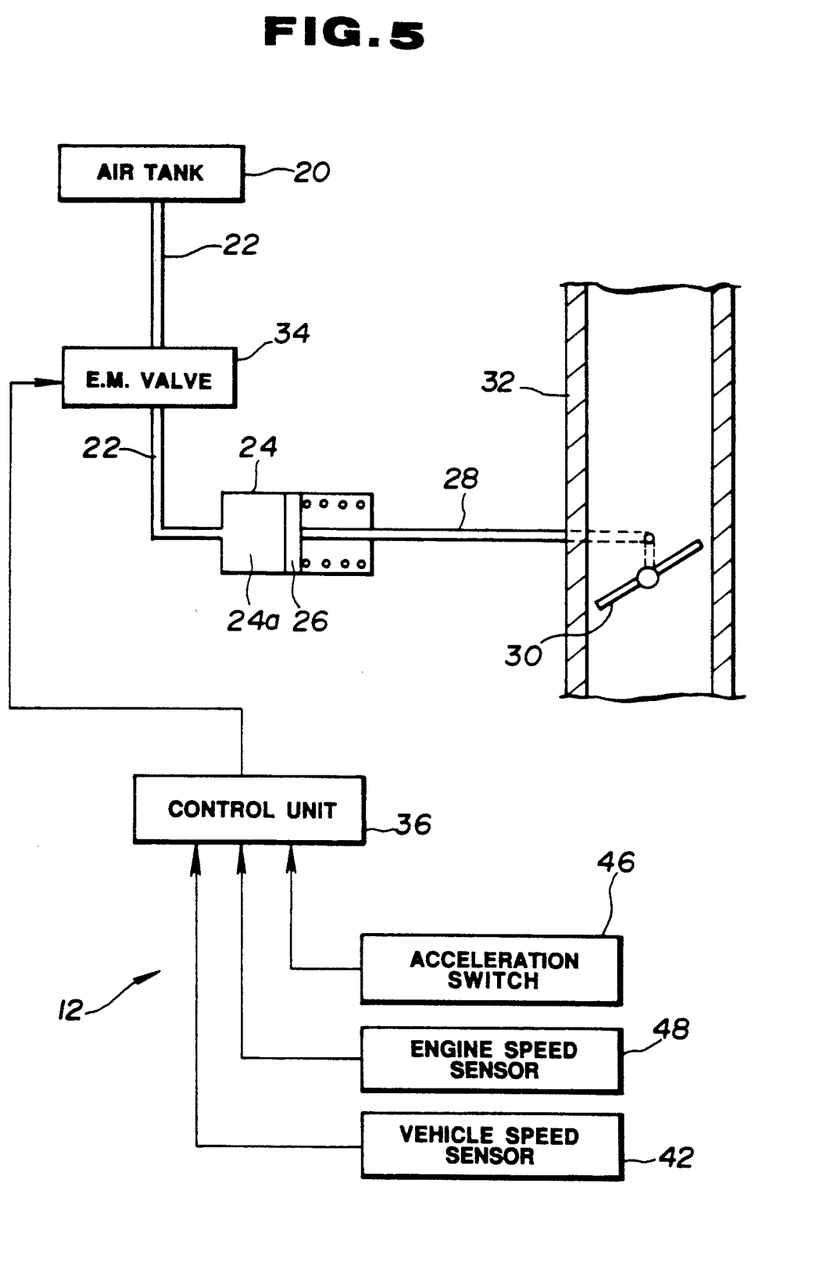
FIG. 5 is a diagrammatic view of a second embodiment of the control system in accordance with the present invention.

FIG. 5 illustrates a second embodiment of the control system according to the present invention, which is similar to the first embodiment of FIGS. 1 and 2 with the exception that an acceleration sensor 46 and an engine speed sensor 48 are used in place of the select position sensor 40 and the throttle opening degree sensor 44.

In this embodiment, the acceleration switch 46 is adapted to be switched ON to output an electrical signal to the control unit 36 when an accelerator pedal (not shown) is put into an idle condition in which the throttle valve is fully closed. The engine speed sensor 48 is adapted to output an electrical signal representative of engine speed of the engine 14.

Figure 6:
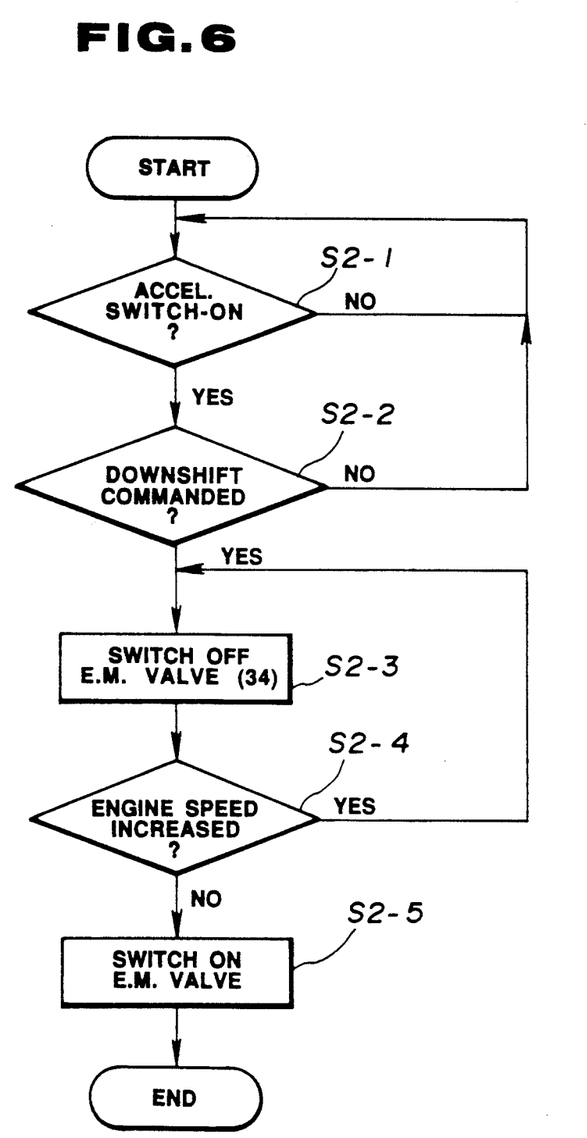
FIG. 6 is a flowchart of showing a control routine for the control system of FIG. 2.

The operation of the second embodiment control system will be discussed with reference to a flowchart of FIG. 6 in which the routine of operating the electromagnetic valve 34 is shown.

First, a judgement is made as to whether the throttle valve is fully closed or not at a step S2-1, so that the engine brake condition is established. When the throttle valve is fully closed, a judgement is made as to whether a command of making a downshift of the automatic transmission 16 is made at a step S2-2. The downshift making command is the signal representative of the automatic downshift, output from the control unit 36, and/or a signal representative of a driver's selecting operation for a transmission selector (not shown) to make a downshift of the transmission 16.

When the command of making the downshift is made, a signal for switching OFF the electromagnetic valve 34 is output regardless of other vehicle and power plant operating conditions at a step S2-3, so that the effect of the exhaust brake 18 is released. Then, a judgement is made as to whether the engine speed of the engine 14 is increasing or not at a step S2-4. During a time period at which the engine speed is increasing, the switched OFF state of the electromagnetic valve 34 is maintained. When the engine speed begins to decrease, the electromagnetic valve 34 is switched ON at a step S2-5, so that the effect of the exhaust brake 18 is restored.

Figure 7:
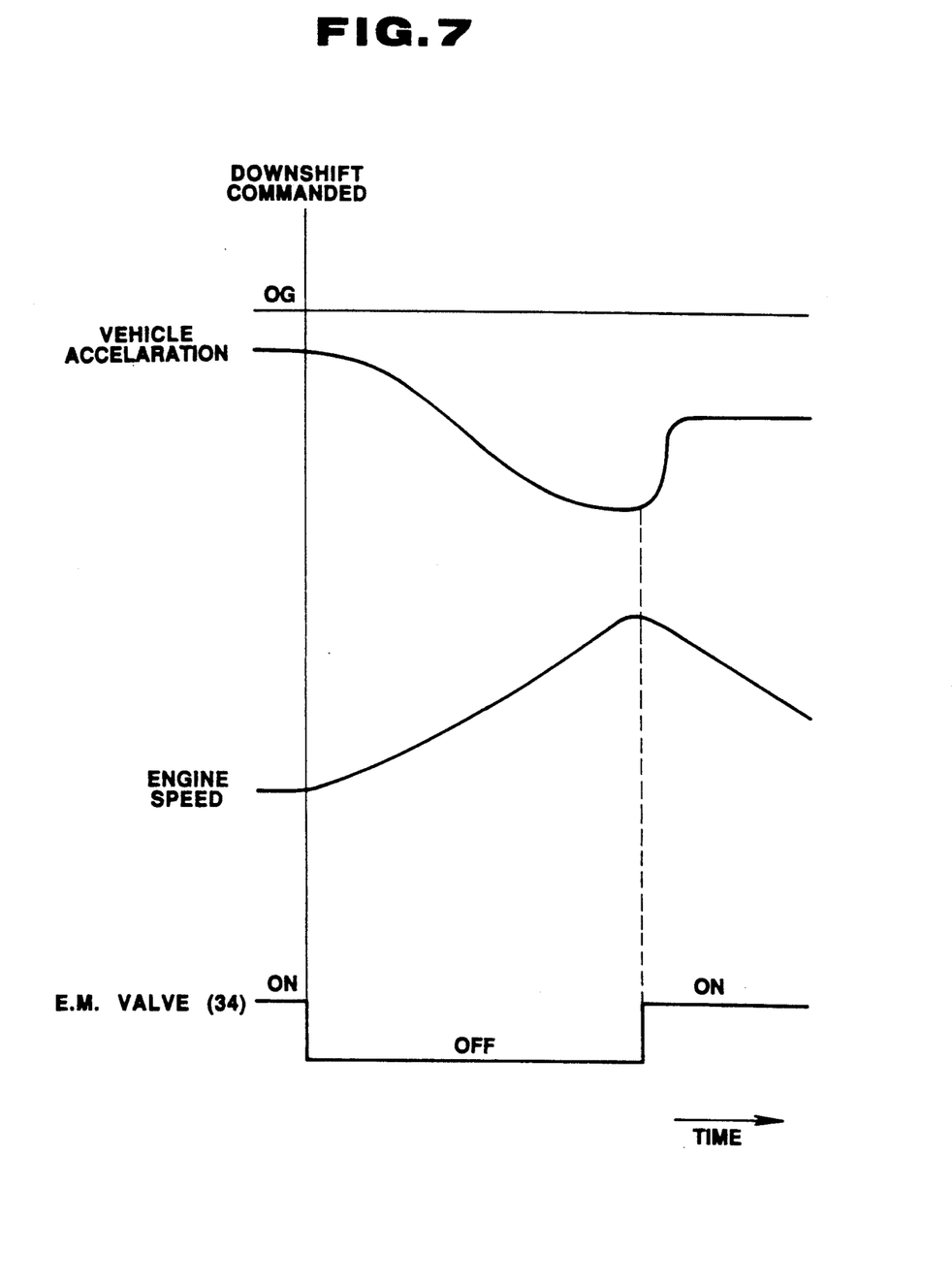
FIG. 7 is a graph showing an operational mode of a vehicle controlled by the control system of FIG. 5

Thus, according to the above-discussed control of the second embodiment control system 12, when the downshift of the transmission is commanded under the engine brake condition, the exhaust brake 18 is immediately released from application. This exhaust brake released condition is maintained during the time period in which the engine speed is increasing; however, the operation of the exhaust brake is restarted from a time point at which the increase in engine speed has stopped. During such a time, a vehicle acceleration, an engine speed and the operation of the electromagnetic valve 34 make changes as shown in FIG. 7 whose data were experimentally obtained. Thus, the releasing of the exhaust brake is controlled in accordance with a change of engine speed, and therefore the operation of the exhaust brake is restarted simultaneously with the completion of the shifting of the transmission even if the kinds (for example, fourth to third speeds, and fourth to second speeds) of the shifting are different.

In other words, a shifting of the automatic transmission is initiated, the engine speed begins to increase because the shifting is toward the side of a larger speed-changing ratio. Then, the engine speed initiates to decrease simultaneously with the completion of the shifting. The exhaust brake restores its operation to improve engine brake at a time point where the engine speed changes from its increase to its decrease. The shifting is completed at this time point, and therefore the exhaust brake initiates its operation. Thus, even though times required are different for various kinds of shifting, the operation of the exhaust brake can be always restored simultaneously with completion of the shifting of the automatic transmission, thereby obtaining an effective operational manner of the exhaust brake while improving the drivability of the vehicle.

Figure 8:
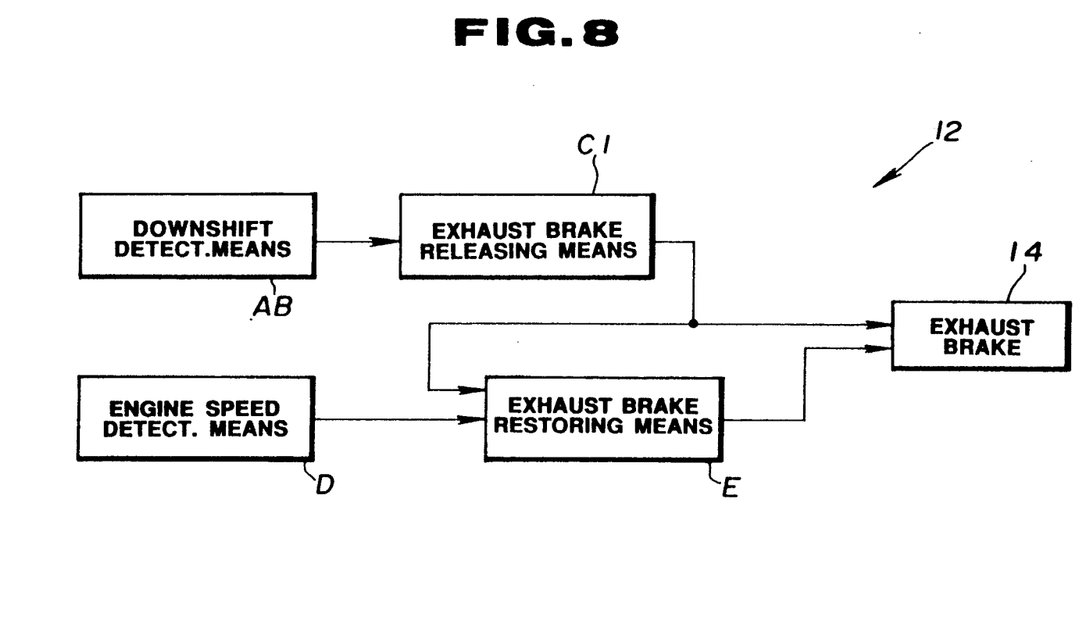
FIG. 8 is a block diagram of the control system for FIG. 5.

FIG. 8 shows the principle of the second embodiment control system 12. The control system 12 is for the power plant 10 including the automatic transmission 16 and the exhaust brake 18, and comprised of downshift and engine brake detecting means AB for detecting the engine brake condition and the command of making a downshift of the automatic transmission. Exhaust brake releasing means C1 is provided to put the exhaust brake into the inoperative condition in response to both the detected engine brake condition and downshift command. Engine speed detecting means D is provided to detect the engine speed of the engine. Additionally, exhaust brake restoring means E is provided to put the exhaust brake into an operative condition in response to the detected engine speed which is decreasing.

Figure 9:
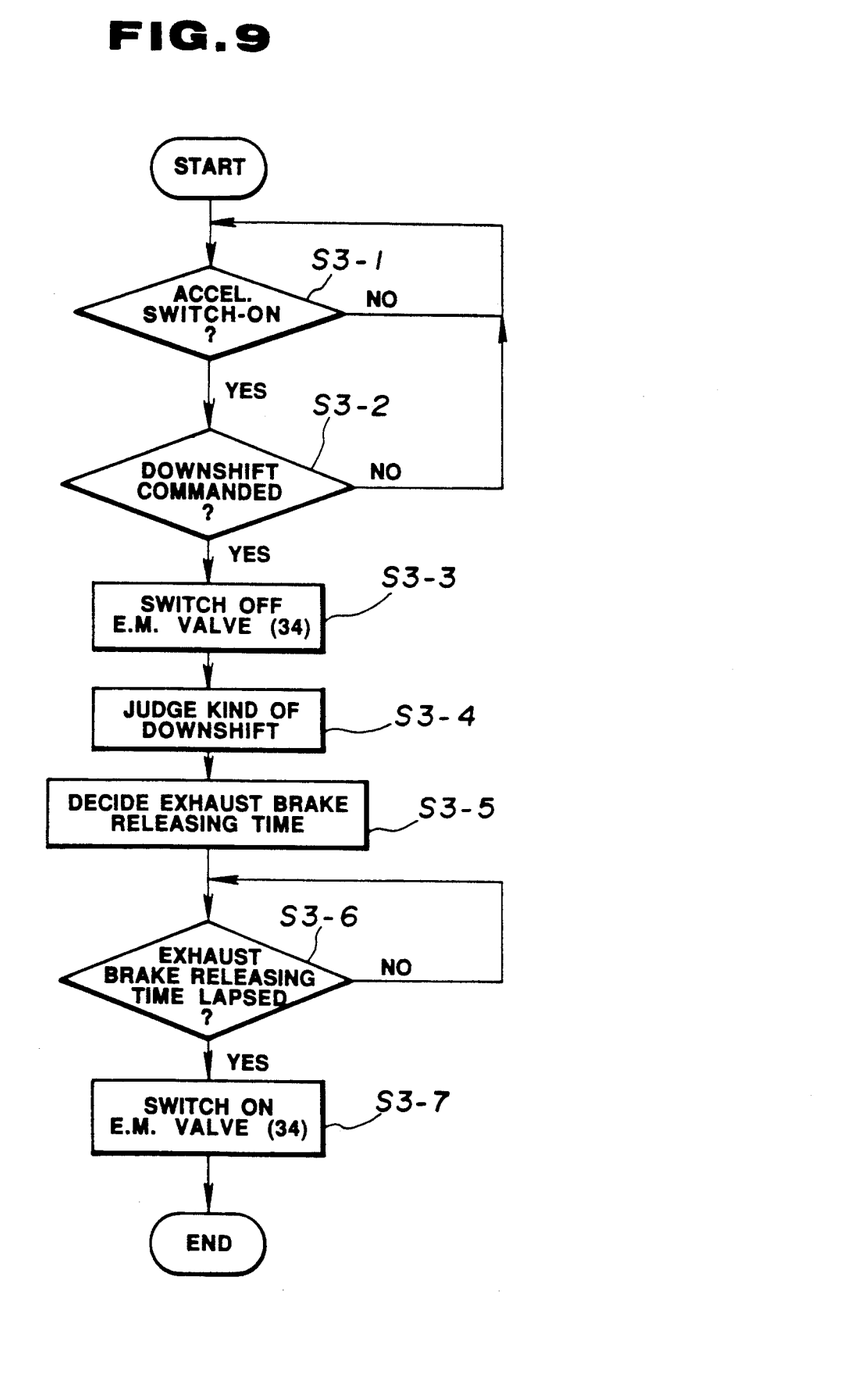
FIG. 9 is flowchart showing a control routine of a third embodiment of the control system in accordance with the present invention.

FIG. 9 illustrates a flowchart of a control manner of a third embodiment of the control system 12 according to the present invention. The third embodiment control system 12 is similar to the second embodiment control system of FIG. 5 except for a part of the control manner of the control unit 36. Accordingly, the explanation of the control manner of FIG. 9 will be made also with reference to FIG. 2.

First, a judgement is made as to whether the throttle valve is fully closed or not at a step S3-1. When the throttle valve is fully closed so that the engine brake condition is established, a judgement is made as to whether a command for making a downshift of the automatic transmission 16 is made at a step S3-2. The downshift making command is a signal representative of the automatic downshift, output from the control unit 36, and/or a signal representative of a driver's selecting operation for a transmission selector (not shown) to make a downshift of the transmission 16.

When the command for making the downshift is made, a signal for switching OFF the electromagnetic valve 34 is output regardless of other vehicle and power plant operating conditions at a step S3-3, so that the effect of the exhaust brake 18 is released or put into the inoperative condition. Then, the kind (for example, the shift of fourth to third speeds, or the shift of fourth to second speeds) of the commanded downshift is judged at a step S3-4. Thereafter, a releasing time of the exhaust brake 18 is decided in accordance with both the vehicle speed (detected by the vehicle speed sensor 42) and the kind of the commanded downshift at a step S3-5. It will be understood that the exhaust brake 18 is released from its application during the exhaust brake releasing time. Subsequently, a judgement is made as to whether the decided exhaust brake releasing time has lapsed or not at a step S3-6. Until the exhaust brake releasing time has lapsed, the OFF state of the electromagnetic valve 34 is maintained. When the exhaust brake releasing time has lapsed, the electromagnetic valve is switched ON to allow the exhaust brake 18 to be applied at a step S3-7.

Thus, according to the above control of the control system 12, when the downshift is commanded under the engine brake condition, the operation of the exhaust brake 18 is immediately released to put the exhaust brake 18 into the inoperative condition. Accordingly, the exhaust brake 18 is maintained at its inoperative condition until the exhaust brake releasing time has lapsed, and restarts its operation at a time point at which the exhaust brake releasing time has lapsed. The exhaust brake releasing time is set according to the vehicle speed and the kind of the downshift and corresponds to a time from the initiation to termination of the downshift operation in the automatic transmission 16. Thus, the releasing condition of the exhaust brake 18 is controlled in accordance with the vehicle speed and the kind of the downshift, and therefore the operation of the exhaust brake is restarted simultaneously with the termination of the shifting even though the kinds of the downshift are different.

As appreciated from the above, according to the third embodiment control system, the time for temporarily releasing the exhaust brake is decided in accordance with the kind of shifting in addition to the vehicle speed. Accordingly, the exhaust brake is always released from its operation by the time corresponding to a time required for the shifting. This effectively prevents, for example, an engine brake effect from lowering due to a too long exhaust brake releasing time, a shift shock from increasing due to a too short exhaust brake releasing time, and clutches in the automatic transmission from lowering in durability.

Figure 10:
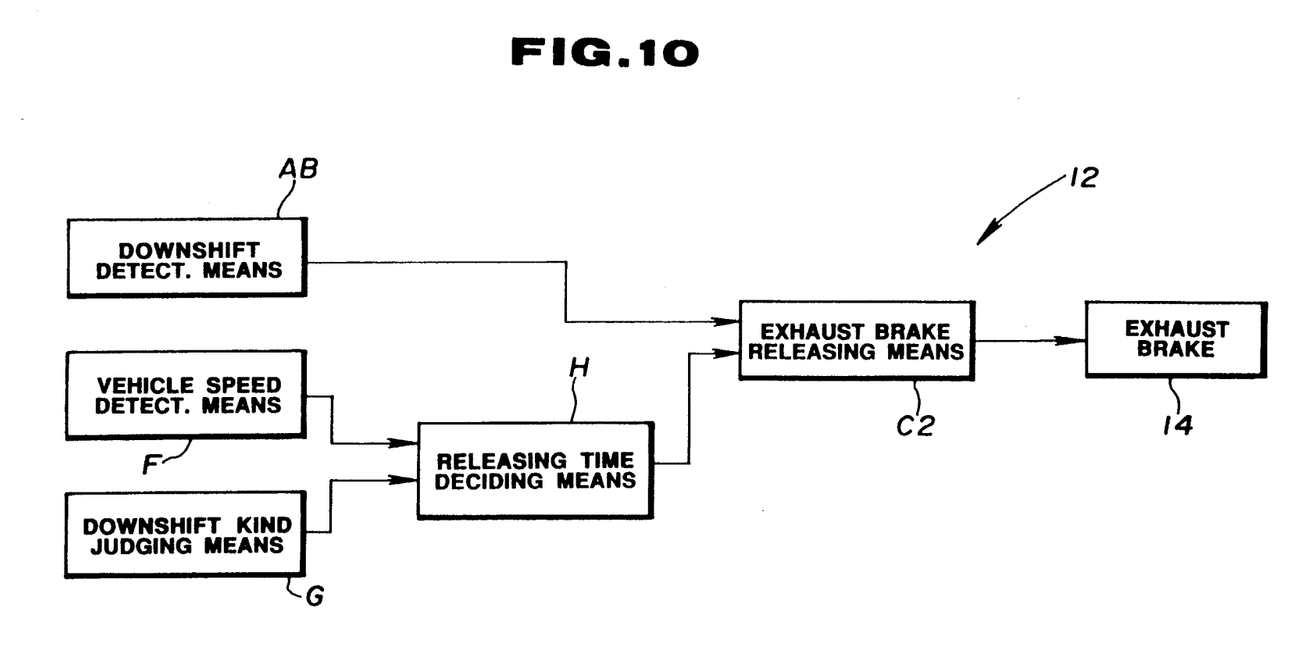
FIG. 10 is a block diagram showing the principle of the control system of FIG. 5.

FIG. 10 shows the principle of the above-discussed third embodiment control system 12. The control system 12 is for the vehicular power plant 10 including the automatic transmission 16 and the exhaust brake 18, and comprised of downshift and engine brake detecting means AB for detecting the engine braking condition and the command of making a downshift of the automatic transmission. Vehicle speed detecting means F is provided to detect a vehicle speed of a vehicle on which the power plant is mounted. Downshift kind judging means G is provided to detect the kind of the commanded downshift. Releasing time deciding means H is provided to decide an exhaust brake releasing time in accordance with the detected vehicle speed and the detected kind of the downshift, in which the exhaust brake is in the inoperative condition during the exhaust brake releasing time. Additionally, exhaust brake releasing means C2 is provided to temporarily put the exhaust brake into the inoperative condition during a time period between a first timing at which the downshift command is detected and a second timing at which the exhaust brake releasing time has lapsed.

Figure 11:
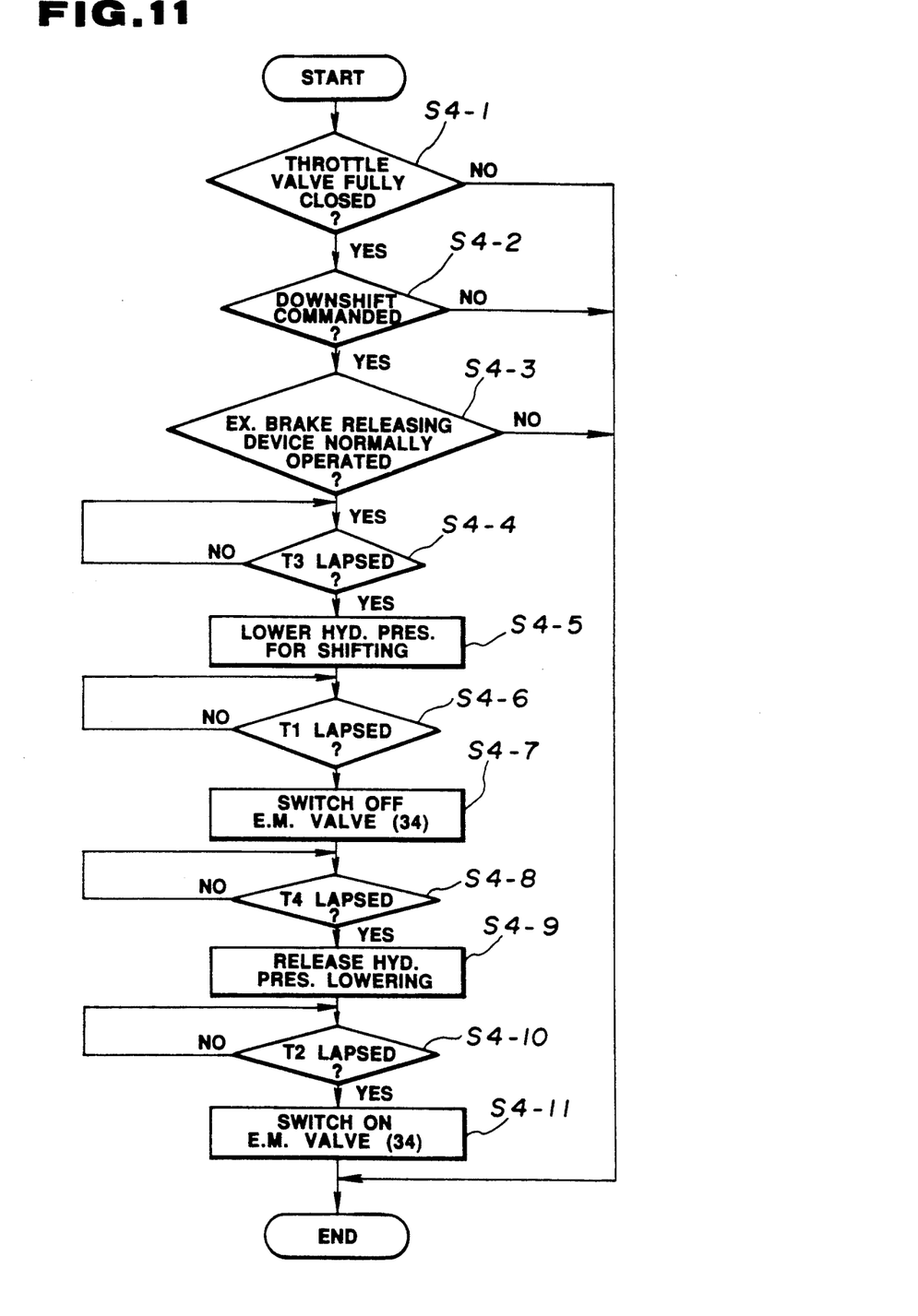
FIG. 11 is a flowchart of a control routine of a fourth embodiment of the control system in accordance with the present invention.

FIG. 11 illustrates a flowchart of a control manner of a fourth embodiment of the control system 12 according to the present invention. The fourth embodiment control system 12 is similar to the first embodiment control system of FIGS. 1 and 2 except for a part of the control manner of the control unit 36. Accordingly, the explanation of the control manner of FIG. 11 will be made also with reference to FIGS. 1 and 2.

In case that the select position of the transmission selector of the automatic transmission 16 is the D range, the control unit 36 generates signals in accordance with signals from the vehicle speed sensor 42 and the throttle opening degree sensor 44 and outputs them to the control valves in the control valve assembly 38. As a result, the shifting is automatically made in the automatic transmission 16, in accordance with a previously set shifting pattern programmed in the control unit 36.

Figure 12:
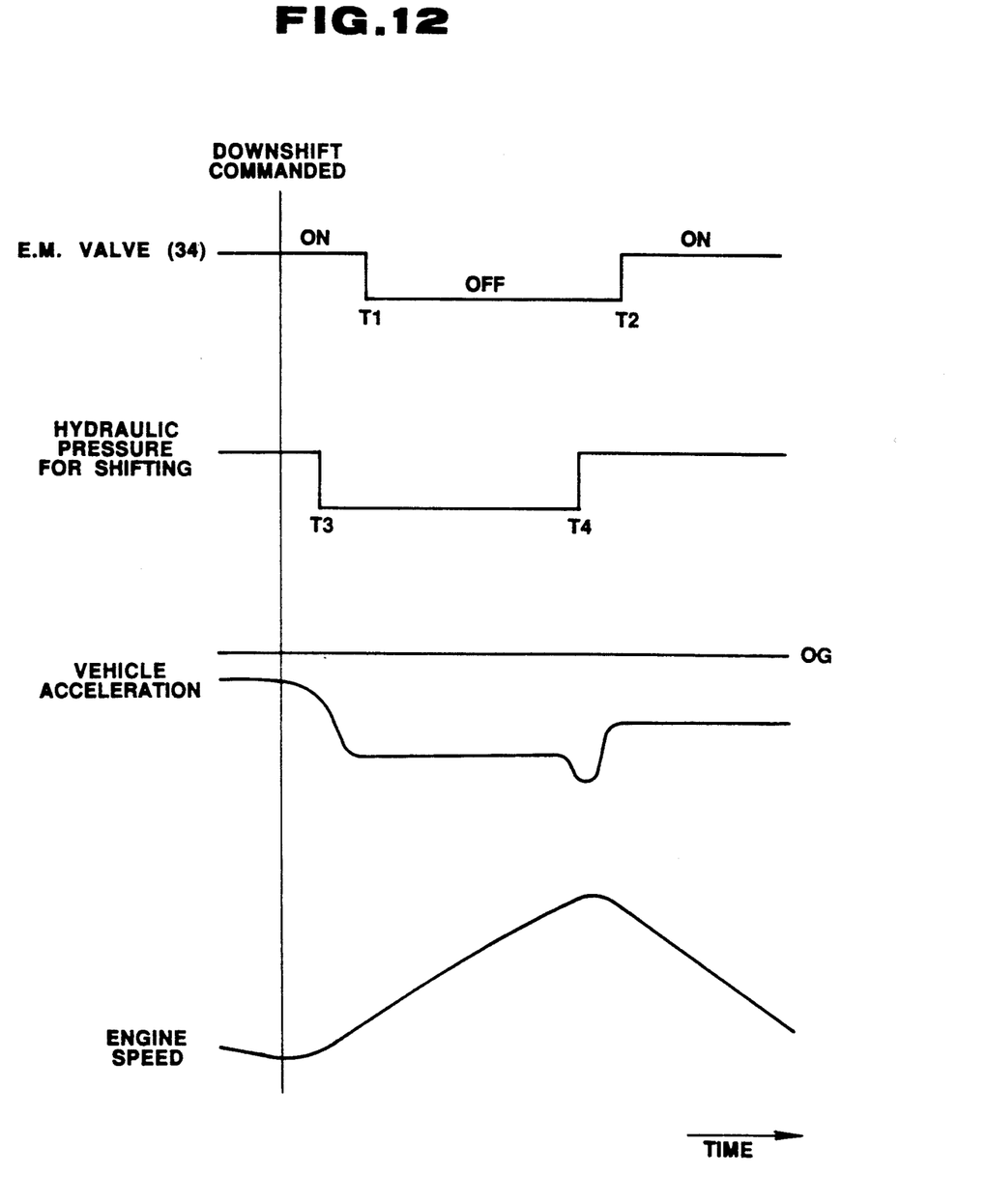
FIG. 12 is a graph showing an operational mode of a vehicle, controlled by a fourth embodiment of the control system in accordance with the present invention.

When the select position is changed to a 2 range for engine braking during a vehicle cruising in the D range of the automatic transmission 16, a control for the power plant 10 is carried out in accordance with the routine shown in FIG. 11. The explanation of the routine will be made also with reference to FIG. 12 showing variations in operation of the electromagnetic valve 34, in hydraulic pressure for shifting in the automatic transmission 16, in vehicle acceleration of the vehicle, and in engine speed of the engine 14.

First, a judgement is made as to whether the throttle opening degree is zero (i.e., throttle valve fully closed) or not at a step S4-1, thereby detecting whether the engine brake condition is established or not. Then, a judgement is made as to whether the downshift is commanded or not under the engine brake condition at a step S4-2. This downshift includes that made upon the driver's operation of the transmission selector, and an automatic downshift made in the automatic transmission 16.

In case the command of the downshift is made under the engine brake condition, a judgement is made as to whether a device (including a part of the control unit 36 and the like) for temporarily releasing the operation of the exhaust brake 18 is normally operated or not by detecting a signal indicating a difficulty with the device at a step S4-3. When the exhaust brake releasing device is normally operated, a judgement is made as to whether a time T3 has lapsed or not from the command of the downshift at a step S4-4. Upon lapse of the time T3, the control unit 36 generates a signal for lowering a hydraulic pressure for shifting the automatic transmission 16 at a step S4-5, in which the hydraulic pressure is lowered below a normal level at which a normal shifting of the automatic transmission is carried out. Subsequently, a judgement is made as to whether a time T1 has lapsed or not from the command of the downshift at a step S4-6. When the time T1 has lapsed, the electromagnetic valve 34 of the exhaust brake 18 is switched OFF thereby to put the exhaust brake 18 into its inoperative condition at a step S6-7.

Next, a judgement is made as to whether a time T4 has lapsed or not from the command of the downshift at a step S4-8. When the time T4 has lapsed, the control unit 36 stops generation of the signal for the automatic transmission shifting thereby releasing the hydraulic pressure from lowering at a step S4-9. Subsequently, a judgement is made as to whether a time T2 has lapsed or not from the command of the downshift. When the time T2 has lapsed, the electromagnetic valve 34 of the exhaust brake 18 is switched ON thereby to put the exhaust brake 18 into its operative condition at a step S4-11. When the judgement is made indicating occurrence of difficulty in the exhaust brake releasing device, the routine in the flowchart is terminated.

According to the above-discussed control, the exhaust brake 18 is released from its operation or application for a predetermined time (i.e., from the time T1 to the time T2) when the downshift of the automatic transmission 16 is commanded under the engine brake condition. Prior to the time T1, the hydraulic pressure for shifting the automatic transmission 16 is lowered and maintained at the lowered level until the time reaches T4. During a time period including the times T3 to T2, changes are made in operation of the electromagnetic valve 34, in the hydraulic pressure for the automatic transmission shifting, in acceleration of the vehicle equipped with the control system 12, and in engine speed of the engine 14 as shown in a time chart in FIG. 12 whose data were obtained upon conducting experiments. The time measuring operation of the time chart in FIG. 12 is started at the time of commanding the downshift.

Thus, the hydraulic pressure for the automatic transmission shifting is lowered before the exhaust brake 18 is released from the operation or application, thereby lightening the shift shock due to the operation of the exhaust brake 18. Additionally, the hydraulic pressure for the automatic transmission shifting is raised before the restart of operation of the exhaust brake 18, so that slipping and the like of the clutches do not occur in the automatic transmission 16 thereby obtaining a durability for the automatic transmission 16. It will be seen that no control for lowering the hydraulic pressure is carried out in case that a trouble (abnormal condition) occurs in a circuit and the like for temporarily releasing the exhaust brake 18 from its operation as indicated at the step S4-3 in FIG. 11. This can prevent the occurrence of a situation in which the torque capacity of the clutches and the like in the automatic transmission become insufficient owing to lowering in the hydraulic pressure for the automatic transmission shifting even though the exhaust brake 18 is operated. It will be understood that the times T1, T2, T3 and T4 may be suitably set according to the vehicle speed, the kind of shifting in the automatic transmission, and the like.

As appreciated from the above, according to the fourth embodiment, of the control system, the hydraulic pressure for the automatic transmission shifting is lowered before releasing the exhaust brake from its operation when the downshift is commanded under the engine brake condition. Additionally, the hydraulic pressure is restored to its normal level before the restart of the exhaust brake. Therefore, the shift shock during the downshift can be effectively lightened without lowering the durability of the automatic transmission.

Figure 13:
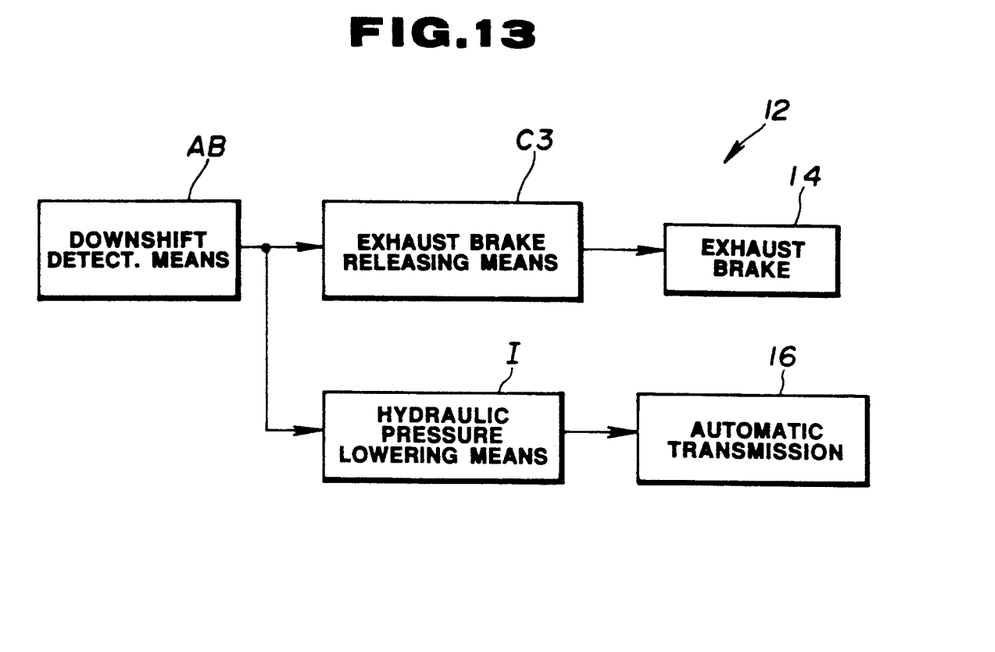
FIG. 13 is a block diagram showing the principle of the control system of FIG. 12.

FIG. 13 shows the principle of the above-discussed fourth embodiment of the control system 12. The control system 12 is for the power plant including the automatic transmission 16 and the exhaust brake 18, and comprised of downshift and engine brake detecting means AB for detecting the engine brake condition and the command of making a downshift of the automatic transmission. Exhaust brake releasing means C3 is provided to put the exhaust brake into the inoperative condition during the time period between the first predetermined time T1 and the second predetermined time T2. The first predetermined time T1 is after a downshift command time at which the downshift command is made. Additionally, hydraulic pressure lowering means I is provided to lower the hydraulic pressure for shifting the automatic transmission below a normal level, for the time period between the third predetermined time T3 and the fourth predetermined time T4. The third predetermined time T3 is between the downshift command time and the first predetermined time T1. The fourth predetermined time T4 is between the first and second predetermined times T1, T2.

Figure 14:
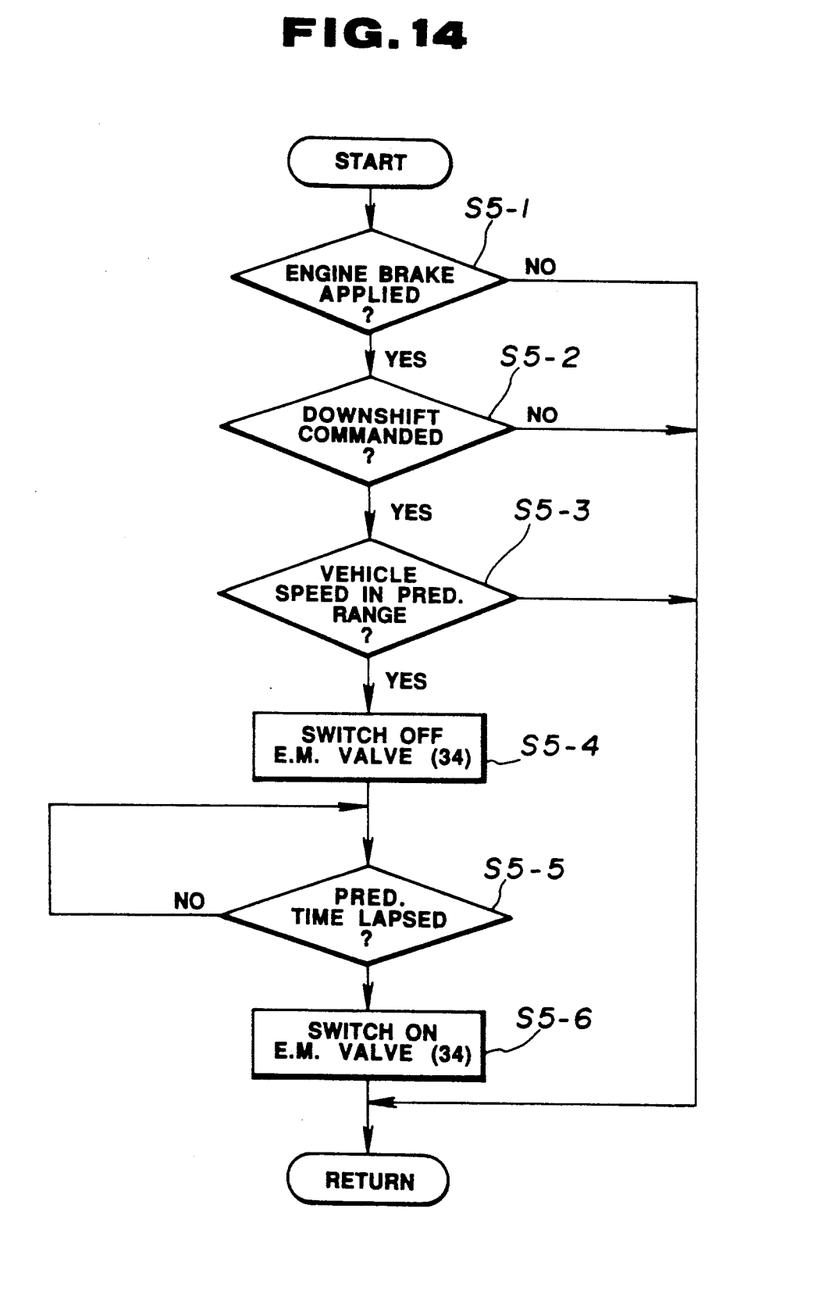
FIG. 14 is a flowchart of a control routine of a fifth embodiment of the control system in accordance with the present invention.

FIG. 14 illustrates a flowchart of a control manner of a fifth embodiment of the control system 12 according to the present invention. The fifth embodiment control system 12 is similar to the first embodiment control system of FIGS. 1 and 2 except for a part of the control manner of the control unit 36. Accordingly, the explanation of the control manner of FIG. 14 will be made also with reference to FIGS. 1 and 2.

First, a judgement is made as to whether an engine operation is in the engine brake condition or not at a stop S5-1. This judgement is made by detecting a throttle state in which the throttle valve is fully closed or nearly fully closed under a condition in which the transmission selector is in a range for engine brake. The throttle state is detected by the throttle opening degree sensor 44. In case of the engine brake condition, a judgement is made as to whether a command of making a downshift of the automatic transmission 16 is made at a step S5-2. The downshift making command is the signal representative of the automatic downshift, output from the control unit 36, and/or a signal representative of a driver's selecting operation for a transmission selector (not shown) to make a downshift of the transmission 16.

When the downshift command is made, a judgement is made as to whether a vehicle speed of the vehicle equipped with the control system 12 is within a predetermined range at a step S5-3. When, the vehicle speed is within the predetermined range, the electromagnetic valve 34 of the exhaust brake 18 is switched OFF to put the exhaust brake into its inoperative condition at a step S5-4. Then, a judgement is made as to whether a predetermined time has lapsed after the switching OFF action of the electromagnetic valve 34. This predetermined time is suitably set according to the vehicle speed, the kind of the shifting of the automatic transmission 16, and the like. Upon lapse of the predetermined time, the electromagnetic valve 34 is returned to be at an ON state to put the exhaust brake into its operative condition at a step S5-6.

Thus, according to the above control, the exhaust brake 18 is temporarily released from its operation or application only when the vehicle speed is within the predetermined range under the downshift condition in which the downshift is commanded in the engine brake condition. The above-mentioned predetermined vehicle speed range is preferably a range in which the shift shock is considerable, and therefore the range is, for example, vehicle speed ranges except for a relatively low vehicle speed range. Thus, the temporary releasing of the exhaust brake 18 cannot be carried out under vehicle driving conditions in which the shift shock is inconsiderable, so that the exhaust brake 18 can be continuously applied to effect the engine brake.

As appreciated from the above, according to the fifth embodiment control system 12, the exhaust brake is temporarily released from its operation only when the vehicle speed is within the predetermined range in which no shift shock problems occur. As a result, the engine brake can operate throughout a considerable wide vehicle driving range, thus making the engine brake effective.

Figure 15:
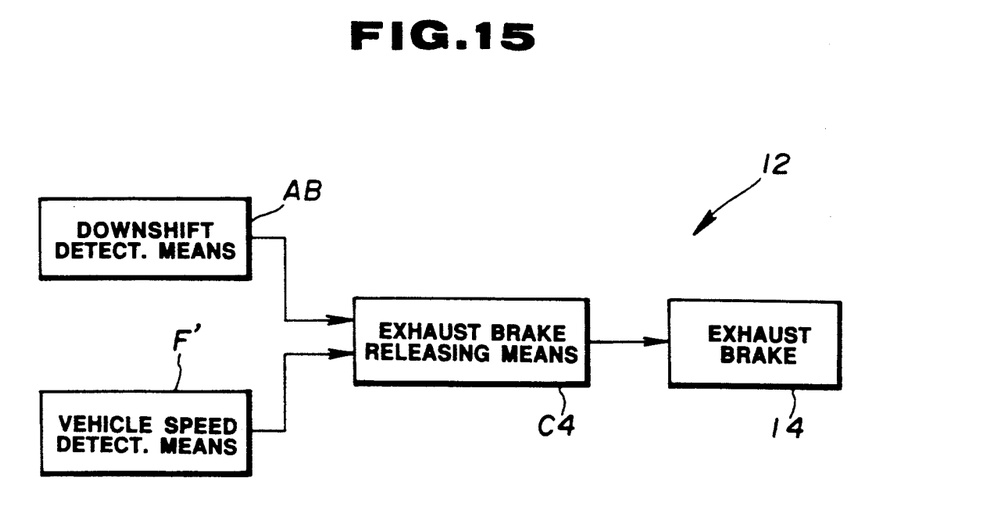
FIG. 15 is a block diagram showing the principle of the control system of FIG. 14.

FIG. 15 shows the principle of the above-discussed fifth embodiment control system 12. The control system 12 is for the vehicular power plant 10 including the automatic transmission 16 and the exhaust brake 18, and comprised of downshift and engine brake detecting means AB for detecting the engine brake condition and the command of making a downshift of the automatic transmission. Vehicle speed detecting means F' is provided to detect a vehicle speed of the vehicle provided with the power plant, the vehicle speed being within a predetermined range. Additionally, exhaust brake releasing means C4 is provided to put the exhaust brake into the inoperative condition in response to all the detected engine brake condition, the downshift command and the vehicle speed.

What is claimed is:

1. A control system for a vehicular power plant including an automatic transmission and an exhaust brake, said control system comprising:

means for detecting an engine brake condition and a command for making a downshift of the transmission;

means for temporarily placing the exhaust brake into an inoperative condition in response to both said detected engine brake condition and said downshift command; and means for detecting an engine speed of the engine, and means for putting the exhaust brake into an operative condition in response to said detected engine speed which is decreasing.

2. A control system as claimed in claim 1, wherein said exhaust brake putting means includes means for detecting an engine speed decreasing condition in which the engine speed is decreasing, and means for putting the exhaust brake into said operative condition in response to said engine speed decreasing condition.

3. A control system as claimed in claim 1, further comprising means for putting the exhaust brake into an inoperative condition in response to the engine speed which is increasing.

4. A control system as claimed in claim 3, wherein said exhaust gas putting means includes means for detecting an engine speed increasing condition in which the engine speed is decreasing, and means for putting the exhaust brake into said inoperative condition in response to said engine speed increasing condition.

5. A control system for a vehicular power plant including an automatic transmission and an exhaust brake, said control system comprising:
   means for detecting an engine brake condition and a command of making a downshift of the transmission;
   means for temporarily putting the exhaust brake into an inoperative condition in response to both said detected engine brake condition and said downshift command;
   means for detecting a vehicle speed of a vehicle on which the power plant is mounted;
   means for detecting a kind of said commanded downshift; and
   means for deciding an exhaust brake releasing time in accordance with said detected vehicle speed and said detected kind of said downshift, the exhaust brake being put into said inoperative condition during said exhaust brake releasing time,
   wherein said exhaust brake putting means includes means for temporarily putting the exhaust brake into said inoperative condition during a time period between a first timing at which said downshift command is made and a second timing at which said exhaust brake releasing time has lapsed.

6. A control system as claimed in claim 5, further comprising means for detecting said first and second timings.

7. A control system for a vehicular power plant including an automatic transmission and an exhaust brake, said control system comprising:
   means for detecting an engine brake condition and a command of making a downshift of the transmission;
   means for temporarily putting the exhaust brake into an inoperative condition in response to both said detected engine brake condition and said downshift command;
   wherein said exhaust brake putting means includes means for putting the exhaust brake into said inoperative condition during a time period between a first predetermined time and a second predetermined time, said first predetermined time being after a downshift command time at which said downshift command is made, wherein said control system further comprises means for lowering a hydraulic pressure for shifting the automatic transmission below a normal level, for a time period between a third predetermined time and a fourth predetermined time, said third predetermined time being between said downshift command time and said first predetermined time, said fourth predetermined time being between said first and second predetermined time.

8. A control system as claimed in claim 7, further comprising means for prohibiting said hydraulic pressure lowering means from its function when said exhaust brake putting means is in an abnormal condition.

9. A control system as claimed in claim 8, further comprising means for detecting said abnormal condition of said exhaust brake putting means.

* * * * *